(12) United States Patent
Kurihara (10) Patent No.: US 11,101,464 B2
(45) Date of Patent: Aug. 24, 2021

(54) NONAQUEOUS ELECTROLYTE SECONDARY BATTERY NEGATIVE ELECTRODE, BINDER FOR NONAQUEOUS ELECTROLYTE SECONDARY BATTERY NEGATIVE ELECTRODE, AND NONAQUEOUS ELECTROLYTE SECONDARY BATTERY

(71) Applicant: TOPPAN PRINTING CO., LTD., Tokyo (JP)

(72) Inventor: Hitoshi Kurihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 311 days.

(21) Appl. No.: 16/168,955

(22) Filed: Oct. 24, 2018

(65) Prior Publication Data
US 2019/0058196 A1 Feb. 21, 2019

Related U.S. Application Data

(63) Continuation of application No. PCT/JP2017/015336, filed on Apr. 14, 2017.

(30) Foreign Application Priority Data

Apr. 28, 2016 (JP) .............................. JP2016-091979

(51) Int. Cl.
| | |
|---|---|
| *H01M 4/62* | (2006.01) |
| *H01M 4/134* | (2010.01) |
| *H01M 4/1395* | (2010.01) |
| *H01M 4/36* | (2006.01) |
| *H01M 4/38* | (2006.01) |
| *H01M 4/66* | (2006.01) |
| *H01M 10/05* | (2010.01) |
| *H01M 4/02* | (2006.01) |

(52) U.S. Cl.
CPC ........... *H01M 4/622* (2013.01); *H01M 4/134* (2013.01); *H01M 4/1395* (2013.01); *H01M 4/364* (2013.01); *H01M 4/386* (2013.01); *H01M 4/621* (2013.01); *H01M 4/66* (2013.01); *H01M 10/05* (2013.01); *H01M 2004/027* (2013.01)

(58) Field of Classification Search
None
See application file for complete search history.

(56) References Cited

U.S. PATENT DOCUMENTS

| | | |
|---|---|---|
| 2006/0235144 A1 | 10/2006 | Hwang et al. |
| 2014/0335410 A1 | 11/2014 | Loveridge et al. |
| 2016/0141626 A1 | 5/2016 | Hosaka et al. |
| 2017/0040615 A1 | 2/2017 | Kurihara |

FOREIGN PATENT DOCUMENTS

| | | | |
|---|---|---|---|
| JP | 2007-157709 A | | 6/2007 |
| JP | 2012-169137 A | | 9/2012 |
| JP | 2013-65494 | * | 4/2013 |
| JP | 2013-065494 A | | 4/2013 |

OTHER PUBLICATIONS

Systematic Investigation of Binders for Silicon Anodes: Interactions of Binder with Silicon Particles and Electrolytes and Effects of Binders on Solid Electrolyte Interphase Formation; Cao Cuong Nguyen, Taeho Yoon, Daniel M. Seo, Pradeep Guduru, and Brett L. Lucht;ACS Applied Materials & Interfaces 2016 8 (19).*
International Search Report regarding PCT/JP2017/015336, dated Jul. 4, 2017, 2 pps.
Liu, J. et al., A high-performance alginate hydrogel binder for the Si/C anode of a Li-ion battery, Chem. Commun., 2014, 50, 6386-6389.
Bonjae Koo et al: "A Highly Cross-Linked Polymeric Binder for High-Performance Silicon Negative Electrodes in Lithium Ion Batteries", Angewandte Chemie, International Edition, vol. 51, No. 35, Aug. 27, 2012 (Aug. 27, 2012), pp. 8762-8767, XP055309328, DE (6 pages).
Extended European Search Report dated Oct. 25, 2019 for corresponding Application No. 17789317.9 (7 pages).

* cited by examiner

*Primary Examiner* — Laura Weiner
(74) *Attorney, Agent, or Firm* — Foley & Lardner LLP (57) ABSTRACT

A negative electrode for a nonaqueous electrolyte secondary battery having improved life characteristics, a binder for a negative electrode of a nonaqueous electrolyte secondary battery, and a nonaqueous electrolyte secondary battery. The negative electrode for a nonaqueous electrolyte secondary battery according to an embodiment includes a current collector, and a mixture layer formed on the current collector and having an active material and a binder. In the binder, an intermolecular chain network in which crosslinking by irreversible bonding and crosslinking by reversible bonding are mixed is formed. For example, a crosslinking treatment is applied to the binder. At this time, by performing crosslinking by reversible bonding and irreversible bonding, crosslinking unevenness is more suppressed, and local concentration of loads on the binder is more suppressed.

8 Claims, 4 Drawing Sheets

EXAMPLE 1 AFTER FRACTURE

FIG.6

NONAQUEOUS ELECTROLYTE SECONDARY BATTERY NEGATIVE ELECTRODE, BINDER FOR NONAQUEOUS ELECTROLYTE SECONDARY BATTERY NEGATIVE ELECTRODE, AND NONAQUEOUS ELECTROLYTE SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/015336, filed on Apr. 14, 2017, which is based upon and claims the benefit of priority to Japanese Patent Application No. 2016-091979, filed on Apr. 28, 2016, the disclosures of which are all hereby incorporated herein by reference in their entireties.

BACKGROUND

Background Art

In recent years, as a secondary battery that can be repeatedly charged and discharged for the purpose of further reducing the amount of petroleum used, reducing greenhouse gases, further increasing the diversification and efficiency of the energy base, nonaqueous electrolyte secondary batteries (for example, Li-ion secondary batteries) are attracting attention. Application of lithium ion secondary batteries to electric vehicles, hybrid electric vehicles and fuel cell vehicles is particularly expected. In electric vehicles, there is a demand to improve the cruising distance, so an increase in energy density of Li-ion secondary batteries will be further required in the future.

Focusing on current negative electrodes of Li-ion secondary batteries, graphite electrodes are generally used. The theoretical capacity of graphite is 372 mAh/g of active material (in other words, 372 mAhg (active material)$^{-1}$). On the other hand, Si and Sn have attracted attention in recent years as active materials exhibiting capacity exceeding graphite. The theoretical capacity of Si is 4200 mAhg (active material)$^{-1}$ and Sn is 990 mAhg (active material)$^{-1}$. However, since Si has a capacity about 11 times that of graphite, the change in volume accompanying Li occlusion and release becomes large. For example, compared with graphite, the increase in volume of Si is about 4 times due to Li occlusion. Compared with graphite, an electrode using an active material (Si, Sn) having a large capacity has a large change in volume accompanying charging and discharging, so there is a possibility of disconnection of the conductive path of the electrode or detachment from the electrode due to pulverization, separation of the current collector and the mixture layer, and the like. There is a possibility that this may cause a decrease in the life of a Li-ion secondary battery.

On the other hand, in recent years, maintaining the electrode structure and improving the life characteristics by applying various polymer binders has been reported. For example, examples of a polymeric binder include carboxymethyl cellulose, polyamide-imides, polyacrylic acid, and sodium alginate. These binders are harder than polyvinylidene fluoride that has conventionally been used as a binder.

In order to improve the mechanical properties of the binder, Patent Literature 1 uses a crosslinked polyacrylic acid binder. In a crosslinked polyacrylic acid, it is harder to fracture the electrode structure than in a non-crosslinked polyacrylic acid, and it is reported that the life characteristics are improved. On the other hand, as described in Non-Patent Literature 1, it has been reported that the life characteristics are also improved for crosslinked sodium alginate with metal ions.

CITATION LIST

Patent Literature

PTL 1: JP 2007-157709 A

Non-Patent Literature

NPL 1: Chem. Commun., 2014, 50, 6386-6389.

SUMMARY OF THE INVENTION

Technical Problem

Incidentally, the inventors conducted intensive studies on the crosslinking effect, and as a result, found that crosslinking by covalent bonding using a crosslinking agent produces high mechanical strength, but there is a large amount of unevenness in the bonding, and the bonding is broken due to local stress concentration, so the inventors concluded that it is difficult to sufficiently improve the life characteristics. On the other hand, a metal ion bond is a reversible bond, so although the bond uniformity is high, the mechanical strength is lower than the covalent bond, which lead the inventors to the conclusion that it is difficult to sufficiently improve the life characteristics.

Therefore, focusing on the above-mentioned problems, an object of the present invention is to provide a negative electrode for a nonaqueous electrolyte secondary battery having improved or even excellent life characteristics, a binder for a negative electrode of a nonaqueous electrolyte secondary battery, and a nonaqueous electrolyte secondary battery.

Intended Solution to the Problem

In order to fully utilize the effect of crosslinking by chemical bonding, the inventors developed a reversible bond such as a metal ion bond, and an irreversible bond such as covalent bonding in order to suppress local stress concentration due to crosslinking unevenness. In other words, a negative electrode for a nonaqueous electrolyte secondary battery according to one aspect of the present invention includes a current collector, and a mixture layer formed on the current collector and having an active material and a binder, wherein an intermolecular chain network is formed in the binder in which crosslinking by irreversible bonding and crosslinking by reversible bonding are mixed.

Moreover, a binder for a negative electrode for a nonaqueous electrolyte secondary battery according to one aspect of the present invention is included in a mixture layer of a nonaqueous electrolyte secondary battery including a current collector and a mixture layer formed on the current collector, wherein an intermolecular chain network is formed in which crosslinking by irreversible bonding and crosslinking by reversible bonding are mixed. Furthermore, a nonaqueous electrolyte secondary battery according to one aspect of the present invention includes the above-described negative electrode for a nonaqueous electrolyte secondary battery, a positive electrode, and a nonaqueous electrolyte arranged between the negative electrode and the positive electrode.

Desired Advantageous Effects of Invention

According to one aspect of the present invention, it is possible to provide a negative electrode for a nonaqueous electrolyte secondary battery having improved or even excellent life characteristics (for example, capable of improving cycle characteristics), a negative electrode binder for a nonaqueous electrolyte secondary battery, and a secondary nonaqueous electrolyte secondary battery.

DETAILED DESCRIPTION

Description of Representative Embodiments

Embodiments of the present invention will be described in detail with reference to the accompanying drawings. With reference to the drawings, barrier films according to embodiments of the present invention will be described. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein. In addition, the embodiments of the present invention are examples of configurations for embodying the technical idea of the present invention, and do not specify the material, shape, structure, arrangement, and the like of each part in the following. The technical idea of the present invention can undergo various modifications within the technical scope defined by the disclosed claims.

(Negative Electrode for Nonaqueous Electrolyte Secondary Battery)

Figure 1:
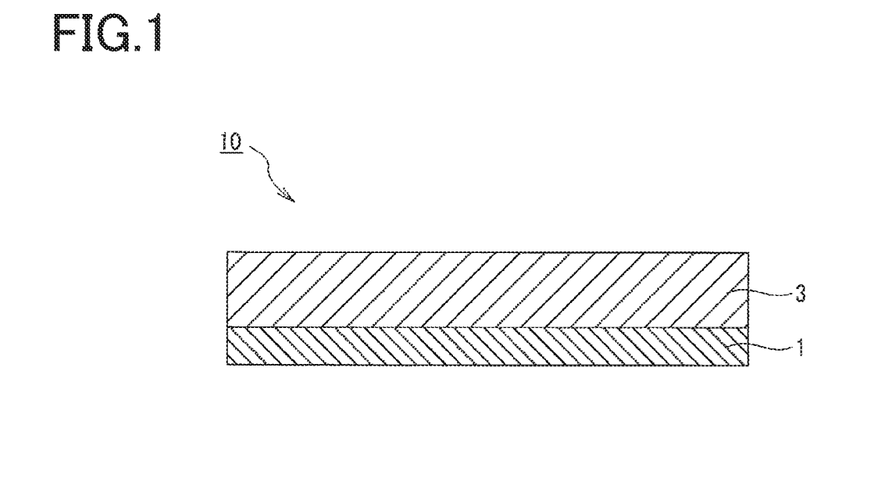
FIG. 1 is a cross-sectional view schematically illustrating a configuration example of a negative electrode 10 for a nonaqueous electrolyte secondary battery according to an embodiment of the present invention.

FIG. 1 is a cross-sectional view schematically illustrating a configuration example of a negative electrode 10 for a nonaqueous electrolyte secondary battery according to an embodiment of the present invention. As illustrated in FIG. 1, the negative electrode 10 for a nonaqueous electrolyte secondary battery has a current collector 1 and a mixture layer 3 formed on the current collector 1. In other words, the negative electrode 10 has a structure in which the mixture layer 3 is laminated on the current collector 1.

The current collector 1 is preferably made of a material having good conductivity, for example, a single metal foil such as gold, silver, copper, nickel, stainless steel, titanium, platinum or the like or an alloy including two or more kinds of these metals. The mixture layer 3 includes, for example, a binder, an active material, and a conductive auxiliary agent. Moreover, in the present embodiment, crosslinking by irreversible bonding and crosslinking by reversible bonding are mixed, and an intermolecular chain network is formed in the binder. Here, the reversible bonding may include an ionic bond by a divalent or higher valence metal cation.

(1) Binder

The binder included in the compound layer 3 may include a polymer composed of an ethylenically unsaturated carboxylic acid compound; for example, includes a polymer composed of an ethylenically unsaturated carboxylic acid compound having a molecular weight of no less than 1,000,000 and no greater than 5,000,000 (high molecular weight), and a copolymer of a flexible monomer and an ethylenically unsaturated carboxylic acid compound having a molecular weight of no less than 1,000 and no greater than 10,000 (lower molecular weight compared with the above-mentioned polymer).

For example, the above-described binder includes a main binder and an auxiliary binder. The main binder includes an ethylenically unsaturated carboxylic acid compound having a molecular weight of no less than 1,000,000 and no greater than 5,000,000. The auxiliary binder includes a copolymer of a flexible monomer and an ethylenically unsaturated carboxylic acid compound. The molecular weight of this copolymer is no less than 1,000 and no greater than 10,000. Here, a part of the main binder and the auxiliary binder may be a salt with a divalent or higher valent metal cation. In addition, the main binder may have crosslinking by a covalent bond and a metal ion bond, and the auxiliary binder may include a metal ion bond without including a covalent bond. In other words, crosslinking due to irreversible bonding is present in the main binder, and crosslinking by irreversible bonding does not need to be present in the auxiliary binder. Furthermore, ionic bonds by the metal ions of the main binder and the auxiliary binder may be achieved with calcium ions.

In this way, in the present embodiment, the main binder has an ethylenically unsaturated carboxylic acid compound having a molecular weight of no less than 1,000,000 and no greater than 5,000,000 (in other words, a high molecular weight binder). Therefore, the mechanical strength of the entire mixture layer 3 can be improved, and the occurrence of cracks in the mixture layer 3 can be more suppressed. In addition, crosslinking treatment is performed on the main binder, so a high effect of suppressing the occurrence of cracks in the mixture layer 3 is obtained. As a result, cutting of the conductive path can be more suppressed, and the life characteristics can be improved.

Moreover, in the present embodiment, the auxiliary binder has a molecular weight of no less than 1,000 and no greater than 10,000, and has a copolymer of a flexible monomer and an ethylenically unsaturated carboxylic acid compound (in other words, a low molecular weight binder). Therefore, the auxiliary binder tends to adhere to the surface of the active material, and together with suppressing the contact between the active material and the electrolytic solution, is able to provide a stable film that is stable to volume change of the active material. This film can be expected to act as a SEI (Solid Electrolyte Interphase). As a result, it is possible to suppress continuous destruction and generation of the SEI by repeated charging and discharging, and to improve the life characteristics.

Examples of the polymer that includes the ethylenically unsaturated carboxylic acid compound used for the main binder preferably include, for example, a sodium salt, lithium salt, potassium salt, magnesium salt, calcium salt, ammonium salt and the like of polyacrylic acid, maleic acid acrylate copolymer, styrene acrylate copolymer, acrylic acid vinyl acetate polymer, and the like. Among these, sodium polyacrylate is particularly preferable from the viewpoint of improving the life characteristics as will be described later.

Examples of copolymers of a flexible monomer and an ethylenically unsaturated carboxylic acid compound used for the auxiliary binder preferably include, for example, acrylic acid-maleic acid copolymer, styrene acrylic acid copolymer, olefin acrylate copolymer, and the like. Among these, acrylic acid-maleic acid copolymer is particularly preferred. Note that the auxiliary binder is a copolymer including a maleic acid moiety, and a part of the maleic acid moiety may undergo intramolecular acid anhydride treatment with the adjacent carboxyl groups. Furthermore, the proportion of the auxiliary binder is no less than 0.1 mass % and no greater than 50 mass % with respect to the total weight of the binder (main binder and auxiliary binder).

In addition, the crosslinking treatment by covalent bonding of the main binder is carried out using a crosslinking agent. As the crosslinking agent, for example, a crosslinking agent that reacts with a carboxylic acid to form a crosslinked product can be used. Note that in the binder including the main binder and the auxiliary binder, no less than 0.01 mol % and no greater than 2.0 mol % of the reactive groups with respect to the sum total of crosslinkable reactive groups may be involved in crosslinking by reversible bonding and irreversible bonding. Moreover, the total number of reactive groups involved in crosslinking by reversible bonding of the main binder and the auxiliary binder may be 1 to 9 times the number of reactive groups involved in crosslinking by irreversible bonding of the main binder.

The mixture layer 3 is formed, for example, by coating the current collector 1 with a negative electrode slurry. The negative electrode slurry is made by dripping a crosslinking agent into a polymer aqueous solution to complete a crosslinking reaction by covalent bonding, then performing crosslinking treatment by metal ion bonding with a calcium salt, adding an auxiliary binder, and finally, mixing in a conductive auxiliary agent and active material. The crosslinking agent is not particularly limited as long as it is a crosslinking agent that reacts with a carboxylic acid group to form crosslinks. As the crosslinking agent in the present embodiment, for example, it is preferable to use a carbodiimide compound or an aziridine compound that can complete the crosslinking reaction in a few minutes at room temperature. Among these, an aziridine compound is particularly preferable. The main binder may also be a synthesized polymer obtained by adding a small amount of a multifunctional monomer from the monomer polymerization stage.

(2) Active Material

The active material of the present embodiment is not particularly limited as long as it can reversibly occlude and release Li, and it is possible to use a known active material, however it is preferable to use a material that is alloyed with Li. Particularly, when the material used for the active material is a material having a larger capacity than the graphite, the effect of the present embodiment is remarkably obtained.

As a material alloyed with Li, for example, one or more alloys selected from a group consisting of Si, Ge, Sn, Pb, Al, Ag, Zn, Hg, and Au can be used. Preferably, the material is $SiO_x$, and more preferably x is no less than 0 and no greater than 1.5. In the case where x is larger than 1.5, it is impossible to secure sufficient occlusion and release of Li. In addition, not only this kind an active material but also graphite may be added as an active material.

(3) Conductive Auxiliary Agent

As the conductive auxiliary agent, for example, carbon black, natural graphite, artificial graphite, as well as metal oxides such as titanium oxide and ruthenium oxide, metal fibers, and the like can be used. Among these, carbon black having a structure is preferable, and in particular, furnace black, Ketjen black and acetylene black (AB) that are one type thereof are preferable. Note that a mixture of carbon black and another conductive agent, for example, vapor-grown carbon fiber (VGCF) is also preferable.

(Nonaqueous Electrolyte Secondary Battery)

Figure 2:
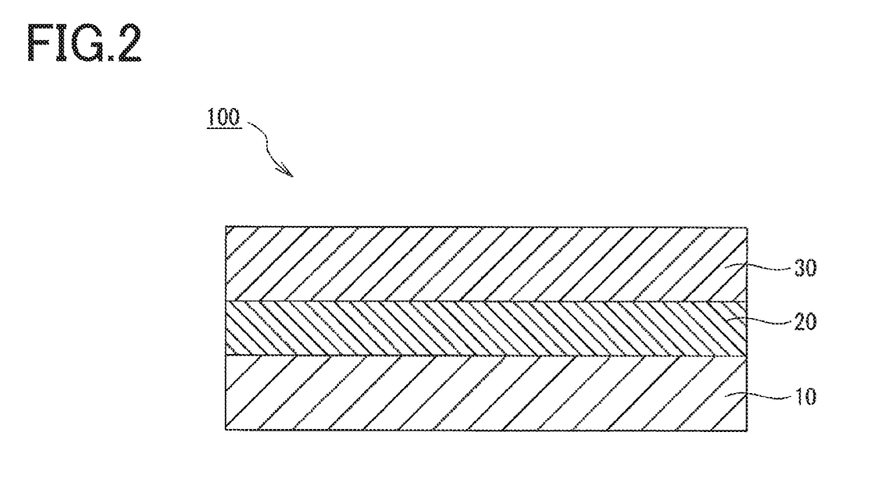
FIG. 2 is a cross-sectional view schematically illustrating a configuration example of a nonaqueous electrolyte secondary battery 100 according to an embodiment of the present invention.

FIG. 2 is a cross-sectional view schematically illustrating a configuration example of the nonaqueous electrolyte secondary battery 100 according to an embodiment of the present invention. As illustrated in FIG. 2, the nonaqueous electrolyte secondary battery 100 includes a negative electrode 10, a positive electrode 30, and a nonaqueous electrolyte 20 filled between the negative electrode 10 and the positive electrode 30. In addition, in the case where the nonaqueous electrolyte 20 is a liquid electrolyte (in other words, an electrolytic solution), a separator may be interposed between the negative electrode 10 and the positive electrode 30.

As the solvent of the electrolyte solution used for the nonaqueous electrolyte secondary battery, for example, low viscosity chain carbonic acid esters such as dimethyl carbonate, diethyl carbonate, and the like, cyclic carbonic acid esters having a high dielectric constant such as ethylene carbonate, propylene carbonate, butylene carbonate, and the like, γ-butyrolactone, 1,2-dimethoxyethane, tetrahydrofuran, 2-methyltetrahydrofuran, 1,3-dioxolane, methyl acetate, methyl propionate, vinylene carbonate, dimethyl formamide, sulfolane and a mixed solvent of these can be used. The electrolyte included in the electrolytic solution is not particularly limited, and known electrolytes can be used. As the electrolyte in the present embodiment, for example, $LiClO_4$, $LiBF_4$, $LiAsF_6$, $LiPF_6$, $LiCF_3SO_3$, $LiN(CF_3SO_2)_2$, $LiI$, $LiAlCl_4$ and the like, and mixtures of these and the like can be used. Preferably, the electrolyte is a lithium salt in which one or two or more of $LiBF_4$ and $LiPF_6$ are mixed.

Effect of the Embodiment

According to this embodiment, the binder has high mechanical strength. For example, the main binder suppresses the destruction of the mixture layer. Furthermore, since the auxiliary binder covering the surface of the active material having a large volume change can form a stable film on the surface of the active material, it is possible to suppress the continuous SEI generation accompanying repeated charging and discharging.

To explain this in more detail, the present embodiment has the following effects: (1) A negative electrode 10 for a nonaqueous electrolyte secondary battery according to this embodiment includes a current collector 1 and a mixture layer 3 formed on the current collector 1. Then, in the binder in the mixture layer 3, irreversible bonds and reversible bonds are mixed so that an intermolecular chain network is formed in the binder. For example, the binder undergoes crosslinking treatment, and at least one polymer of the binder undergoes a crosslinking treatment that includes both irreversible bonding and reversible bonding. According to such a configuration, the mechanical strength of the binder is increased, and destruction of the mixture layer 3 due to repeated charging and discharging can be more suppressed. As a result, it is possible to provide a negative electrode 10 for a nonaqueous electrolyte secondary battery having improved or even excellent life characteristics.

(2) Moreover, in the negative electrode 10, the polymer constituting the binder is a polymer that includes an ethylenically unsaturated carboxylic acid compound. According to such a configuration, in the crosslinking treatment by irreversible bonding and reversible bonding, a carboxylic acid group can be used as a binding site. (3) Furthermore, in the negative electrode 10, the binder has a main binder and an auxiliary binder. The main binder includes a polymer that includes an ethylenically unsaturated carboxylic acid having a molecular weight of no less than 1,000,000 and no greater than 5,000,000. The auxiliary binder includes a copolymer of a flexible monomer and an ethylenically unsaturated carboxylic acid compound having a molecular weight of no less than 1,000 and no greater than 10,000. With such a configuration, the shape of the mixture layer 3 can be maintained by the main binder. In addition, the auxiliary binder is able to suppress the continuous destruction and generation of SEI continuously due to repeated charging and discharging.

(4) Moreover, in the negative electrode 10 described above, a divalent or higher valent metal cation (for example, calcium ion) is used for the crosslinking treatment by the reversible bond of the polymer included in the binder. According to such a configuration, the crosslinking treatment can be performed more appropriately. (5) Furthermore, in the negative electrode 10, the main binder constituting the binder undergoes crosslinking treatment by irreversible bonding, and the auxiliary binder does not undergo crosslinking treatment by irreversible bonding. In other words, in the main binder, crosslinking by irreversible bonding and crosslinking by reversible bonding are mixed, however the auxiliary binder does not include crosslinking by irreversible bonding. According to such a configuration, it is possible to achieve a main binder having a high fracture strength for retaining the shape of the mixture layer and an auxiliary binder having high elongation that easily follows the volume change of the active material.

(6) In addition, in the negative electrode 10, the auxiliary binder is a copolymer that includes a maleic acid moiety. According to such a configuration, in the step of preparing the negative electrode, the maleic acid moiety is dehydrated and condensed to form a ring. In other words, a part of the maleic acid moiety is subjected to intramolecular acid anhydride treatment with adjacent carboxyl groups to generate a cyclic hydrocarbon moiety. This hydrocarbon moiety does not include a carboxylic acid group, so flexibility can be provided.

(7) Moreover, in the negative electrode 10, the crosslinking treatment density by the irreversible bonding of the main binder constituting the binder is equivalent to 0.01 mol % to 3.0 mol % with respect to the total number of reactive groups capable of a crosslinking bond of the main binder, and is the density at which reactive groups are involved in crosslinking. According to such a configuration, the binder can be formed more appropriately. (8) In addition, in the negative electrode 10, the total number of the respective reactive groups involved in the crosslinking by the reversible bonding of the main binder and the auxiliary binder is no less than 1 time and no greater than 9 times the number of reactive groups involved in the crosslinking by the irreversible bonding of the main binder. According to such a configuration, the binder can be formed more appropriately.

(9) Moreover, in the negative electrode 10, the crosslinking agent based on the irreversible bonding of the main binder constituting the binder is an aziridine compound. According to such a configuration, the carboxyl group of the main binder reacts with the aziridine group of the crosslinking agent, and irreversible bonding can be given to the main binder. (10) Furthermore, in the above negative electrode 10, part of the main binder and the auxiliary binder is a salt with metal cations having a valence of 2 or more. For example, the crosslinking agent based on the reversible bonding given to the main binder and the auxiliary binder is a calcium salt. According to such a configuration, the carboxyl group of the main binder and the auxiliary binder and the calcium ions form a metal ion bond, and reversible bonding can be given to the main binder and the auxiliary binder. (11) In addition, in the negative electrode 10, the active material is nanosilicon. With such a configuration, deterioration of the active material is more suppressed, and the cycle characteristics of the negative electrode can be improved.

EXAMPLES

Hereinafter, the present invention will be described in more detail with reference to examples, but the present invention is in not in any way limited by these examples.
(Example 1)
4.96 g of sodium polyacrylate was added to 92.54 g of water (manufactured by Nippon Shokubai Co., molecular weight 5,000,000) was added and stirred with a disperser. Continuing, 0.15 g of a 10-fold diluted aqueous solution of an aziridine compound (PZ-33, manufactured by Nippon Shokubai Co., Ltd.) was added to this polymer solution and stirred for 20 minutes. Next, 2.34 g of a 100-fold diluted aqueous solution of calcium chloride was added and further stirred. From this, a 5% crosslinked sodium polyacrylate aqueous solution was prepared.

The prepared 5% crosslinked sodium polyacrylate aqueous solution was diluted with water up to 0.5%, transferred to a petri dish, and dried at 40° C. The obtained film was cut into a 20×50 mm square. Furthermore, drying at 105° C. under reduced pressure was performed for 5 hours. The result was stored for 3 days in a humidity-controlled booth adjusted to 23.3° C. and 46% humidity. From this, a binder as a tensile test sample was obtained. As will be described later, a tensile test was performed on this binder.

Figure 3:
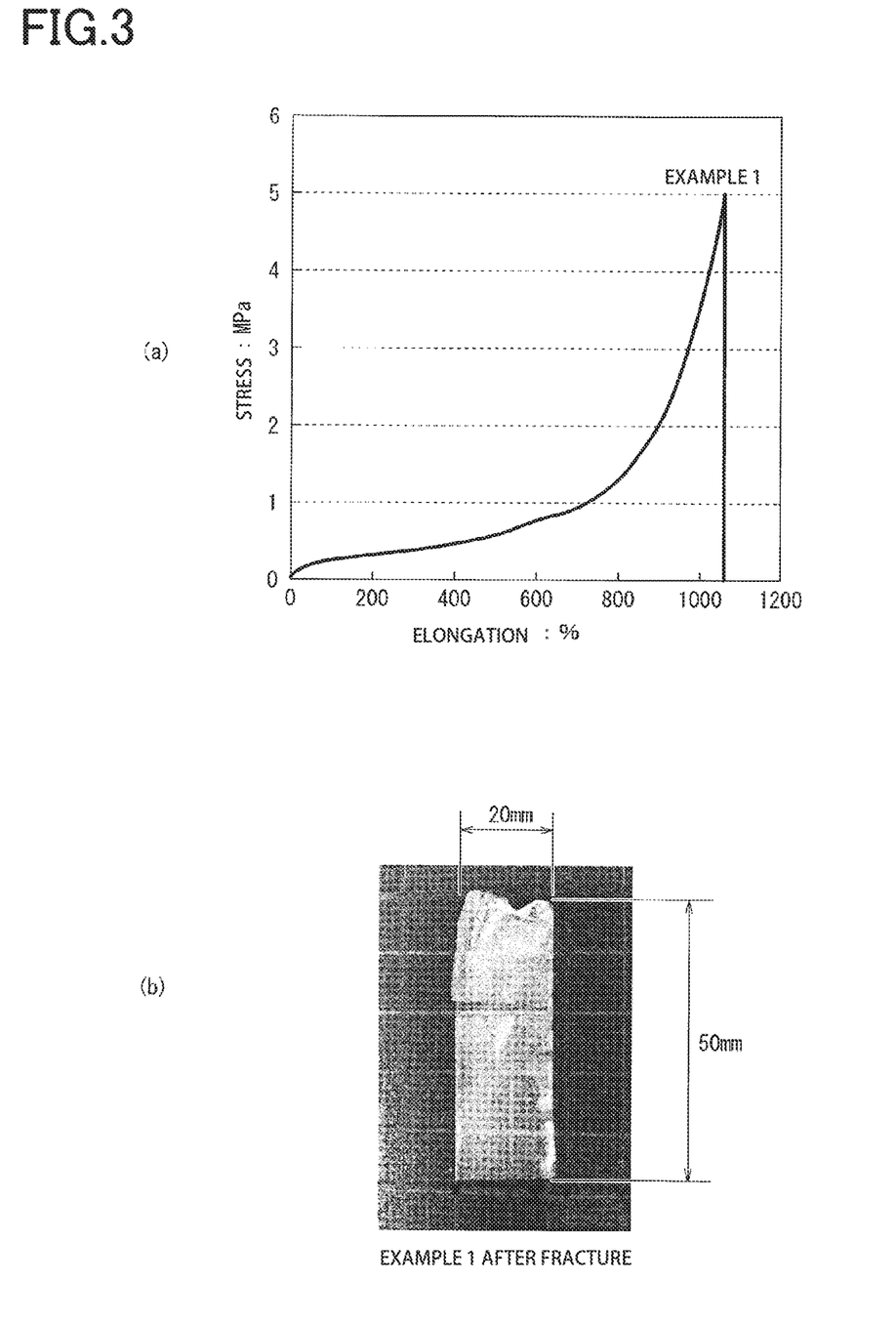
FIG. 3 is a diagram illustrating results of a tensile test of the binder produced in Example 1.

(Tensile Test and Results)
The present inventors performed a tensile test on the binder obtained in Example 1. FIG. 3(a) is a graph illustrating the tensile test results of the binder produced in Example 1. In addition, FIG. 3 (b) is a photograph illustrating the binder after fracture by the tensile test. As illustrated in FIG. 3 (a), in Example 1, elongation was 1000% by adding crosslinking by reversible bonding to crosslinking by irreversible bonding. This indicates that crosslinking unevenness is more suppressed, which is due to being able to prepare a binder which suppresses concentration of local loads in the binder and that does not easily fracture. Furthermore, since there is also crosslinking by irreversible bonding, as shown in FIG. 3 (b), the sample after the tensile test was able to return to nearly the same shape and dimensions as before fracture.

Example 2

To 33.53 g of the 5% crosslinked sodium polyacrylate aqueous solution prepared in Example 1, 8.06 g of water was added and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry.

The obtained negative electrode slurry was coated onto a current collector. A copper foil having a thickness of 12 μm was used as the current collector. The negative electrode slurry was applied using a doctor blade so as to have a basis weight of 1.0 mg/cm$^2$. Continuing, the negative electrode slurry was predried at 80° C. for 30 minutes. The result was then pressed to a density of 1.0 g/cm$^3$. Finally, reduced pressure drying was performed at 105° C. for 5 hours. As a result, an electrode (negative electrode) was obtained. Using the obtained electrode, a half-coin cell was prepared and cycle evaluation was performed.

Example 3

To 94.84 g of water, 2.97 g of sodium polyacrylate (manufactured by Nippon Shokubai Co., Ltd., molecular weight 5,000,000) was added and stirred with a disperser. Continuing, 0.09 g of a 10-fold diluted aqueous solution of an aziridine compound (PZ-33 manufactured by Nippon Shokubai Co., Ltd.) was added to this polymer solution, and the mixture was stirred for 20 minutes. Next, 2.10 g of a 100-fold diluted aqueous solution of calcium chloride was added and further stirred. As a result, a 3% crosslinked sodium polyacrylate aqueous solution was prepared.

Water (1.78 g) was added to 41.91 g of the prepared 3% crosslinked sodium polyacrylate aqueous solution, and stirred with a disperser. Continuing, 0.13 g of 50% acrylic acid-maleic acid copolymer aqueous solution was added and further stirred. Next, 4.41 g of Si particles (2.5 μm), 0.88 g of acetylene black (AB) and 0.88 g of vapor grown carbon fiber (VGCF) were added and stirred. Then, this dispersion was performed with a Filmix to obtain a negative electrode slurry.

The obtained negative electrode slurry was coated onto a current collector. A copper foil having a thickness of 12 μm was used as the current collector. The negative electrode slurry was coated using a doctor blade so as to have a basis weight of 1.0 mg/cm$^2$. Continuing, the negative electrode slurry was predried at 80° C. for 30 minutes. The result was then pressed to a density of 1.0 g/cm$^3$. Finally, reduced pressure drying was performed at 105° C. for 5 hours. As a result, an electrode (negative electrode) was obtained.

Example 4

To 94.32 g of water, 2.96 g of sodium polyacrylate (Nippon Shokubai Co., molecular weight 5 million) was added and stirred with a disperser. Continuing, 0.09 g of a 10-fold diluted aqueous solution of an aziridine compound (PZ-33 manufactured by Nippon Shokubai Co., Ltd.) was added to this polymer solution, and the mixture was stirred for 20 minutes. Next, 2.62 g of a 100-fold diluted aqueous solution of calcium chloride was added and further stirred. As a result, a 3% crosslinked sodium polyacrylate aqueous solution was prepared.

Water (1.78 g) was added to 41.91 g of the prepared 3% crosslinked sodium polyacrylate aqueous solution, and stirred with a disperser. Continuing, 0.13 g of 50% acrylic acid-maleic acid copolymer aqueous solution was added and further stirred. Next, 4.41 g of Si particles (2.5 μm), 0.88 g of acetylene black (AB) and 0.88 g of vapor grown carbon fiber (VGCF) were added and stirred. Then, this dispersion was performed with a Filmix to obtain a negative electrode slurry.

The obtained negative electrode slurry was coated onto a current collector. A copper foil having a thickness of 12 μm was used as the current collector. The negative electrode slurry was coated using a doctor blade so as to have a basis weight of 1.0 mg/cm$^2$. Continuing, the negative electrode slurry was predried at 80° C. for 30 minutes. The result was then pressed to a density of 1.0 g/cm$^3$. Finally, reduced pressure drying was performed at 105° C. for 5 hours. As a result, an electrode (negative electrode) was obtained.

Example 5

To 93.81 g of water, 2.96 g of sodium polyacrylate (Nippon Shokubai Co., molecular weight 5 million) was added and stirred with a disperser. Continuing, 0.09 g of a 10-fold diluted aqueous solution of an aziridine compound (PZ-33 manufactured by Nippon Shokubai Co., Ltd.) was added to this polymer solution, and the mixture was stirred for 20 minutes. Next, 3.14 g of a 100-fold diluted aqueous solution of calcium chloride was added and further stirred. As a result, a 3% crosslinked sodium polyacrylate aqueous solution was prepared.

Water (1.78 g) was added to 41.91 g of the prepared 3% crosslinked sodium polyacrylate aqueous solution, and stirred with a disperser. Continuing, 0.13 g of 50% acrylic acid-maleic acid copolymer aqueous solution was added and further stirred. Next, 4.41 g of Si particles (2.5 μm), 0.88 g of acetylene black (AB) and 0.88 g of vapor grown carbon fiber (VGCF) were added and stirred. Then, this dispersion was performed with a Filmix to obtain a negative electrode slurry.

The obtained negative electrode slurry was coated onto a current collector. A copper foil having a thickness of 12 μm was used as the current collector. The negative electrode slurry was coated using a doctor blade so as to have a basis weight of 1.0 mg/cm$^2$. Continuing, the negative electrode slurry was predried at 80° C. for 30 minutes. The result was then pressed to a density of 1.0 g/cm$^3$. Finally, reduced pressure drying was performed at 105° C. for 5 hours. As a result, an electrode (negative electrode) was obtained.

Example 6

To 94.11 g of water, 4.93 g of sodium polyacrylate (Nippon Shokubai Co., molecular weight 5 million) was added and stirred with a disperser. Continuing, 0.67 g of a 10-fold diluted aqueous solution of an aziridine compound (PZ-33 manufactured by Nippon Shokubai Co., Ltd.) was added to this polymer solution, and the mixture was stirred for 20 minutes. Next, 0.29 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Pressing was not performed. Finally, reduced pressure drying was performed at 105° C. for 5 hours. As a result, an electrode (negative electrode) was obtained.

Example 7

To 93.89 g of water, 4.93 g of sodium polyacrylate (Nippon Shokubai Co., molecular weight 5 million) was added and stirred with a disperser. Continuing, 0.59 g of a 10-fold diluted aqueous solution of an aziridine compound (PZ-33 manufactured by Nippon Shokubai Co., Ltd.) was added to this polymer solution, and the mixture was stirred for 20 minutes. Next, 0.58 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Pressing was not performed. Finally, reduced pressure drying was performed at 105° C. for 5 hours. As a result, an electrode (negative electrode) was obtained.

Example 8

To 93.22 g of water, 4.95 g of sodium polyacrylate (Nippon Shokubai Co., molecular weight 5 million) was added and stirred with a disperser. Continuing, 0.37 g of a 10-fold diluted aqueous solution of an aziridine compound (PZ-33, manufactured by Nippon Shokubai Co., Ltd.) was added to this polymer solution, and the mixture was stirred for 20 minutes. Next, 1.48 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Pressing was not performed. Finally, reduced pressure drying was performed at 105° C. for 5 hours. As a result, an electrode (negative electrode) was obtained.

Example 9

To 92.55 g of water, 4.96 g of sodium polyacrylate (Nippon Shokubai Co., molecular weight 5 million) was added and stirred with a disperser. Continuing, 0.15 g of a 10-fold diluted aqueous solution of an aziridine compound (PZ-33, manufactured by Nippon Shokubai Co., Ltd.) was added to this polymer solution and stirred for 20 minutes. Next, 2.34 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Pressing was not performed. Finally, reduced pressure drying was performed at 105° C. for 5 hours. As a result, an electrode (negative electrode) was obtained.

Example 10

To 92.32 g of water, 4.97 g of sodium polyacrylate (Nippon Shokubai Co., molecular weight 5 million) was added and stirred with a disperser. Continuing, 0.07 g of a 10-fold diluted aqueous solution of an aziridine compound (PZ-33 manufactured by Nippon Shokubai Co., Ltd.) was added to this polymer solution, and the mixture was stirred for 20 minutes. Next, 2.64 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (2.5 μm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Pressing was not performed. Finally, reduced pressure drying was performed at 105° C. for 5 hours. As a result, an electrode (negative electrode) was obtained.

Example 11

To 92.55 g of water, 4.96 g of sodium polyacrylate (Nippon Shokubai Co., molecular weight 5 million) was added and stirred with a disperser. Continuing, 0.15 g of a 10-fold diluted aqueous solution of an aziridine compound (PZ-33, manufactured by Nippon Shokubai Co., Ltd.) was added to this polymer solution and stirred for 20 minutes. Next, 2.34 g of a 100-fold diluted aqueous solution of calcium chloride was added and further stirred. From this, a 5% crosslinked sodium polyacrylate aqueous solution was prepared.

Water (8.06 g) was added to 33.53 g of the prepared 5% crosslinked sodium polyacrylate aqueous solution and stirred with a disperser. Continuing, 0.18 g of 50% acrylic acid-maleic acid copolymer aqueous solution was added and further stirred. Next, 5.88 g of Si particles (100 nm), 1.18 g of acetylene black (AB) and 1.18 g of vapor grown carbon fiber (VGCF) were added and stirred. Then, this dispersion was performed with a Filmix to obtain a negative electrode slurry. The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Finally, reduced pressure drying was performed at 105° C. for 5 hours. As a result, an electrode (negative electrode) was obtained.

Comparative Example 1

To 24.00 g of water, 1.00 g of sodium polyacrylate (Nippon Shokubai Co.) was added and stirred with a disperser. Continuing, 0.10 g of a 10% aqueous solution of an aziridine compound (PZ-33) was added to this polymer solution, and the mixture was stirred at room temperature for 20 minutes. Next, 0.11 g of 50% acrylic acid maleic acid copolymer aqueous solution was added and stirred. Then, 3.53 g of Si particles (100 nm), 0.71 g of acetylene black (AB) and 0.71 g of vapor grown carbon fiber (VGCF) were added and stirred. Then, this dispersion was performed with a Filmix to obtain a negative electrode slurry.

The obtained negative electrode slurry was coated onto a current collector. A copper foil having a thickness of 12 μm was used as the current collector. The negative electrode slurry was coated using a doctor blade so as to have a basis weight of 1.0 mg/cm². Continuing, the negative electrode slurry was predried at 80° C. for 30 minutes. Finally, reduced pressure drying was performed at 105° C. for 5 hours. As a result, an electrode (negative electrode) was obtained.

(Charge and Discharge Evaluation and Results)
(1) Production of a Coin Cell

The inventors prepared coin cells by using the electrodes obtained in Examples 2 to 11 and Comparative Example 1 and repeatedly performed charge and discharge evaluation (in other words, cycle evaluation). Specifically, coin cells were prepared using the electrodes (negative electrodes) obtained in Examples 2 to 11 and Comparative Example 1 and Li electrodes (positive electrodes). Then, for these coin cells, charging and discharging were repeated in a voltage range of 0.01 V to 1.0 V at a charging rate of 1600 mA/g and a discharging rate of 1600 mA/g, and cycle evaluation was performed.

The discharge capacity retention rate was calculated by (discharge capacity at a specified cycle)/(discharge capacity at the first cycle)×100. The coin cells used were of a 2032 type. The electrode was punched into a disk shape having a diameter of 15 mm, and the Li electrode was punched into a disk shape having a diameter of 18 mm, and evaluation was performed. The basic configuration of the coin cell included an electrode, a Li electrode and a separator (Asahi Kasei Corporation, Hipore N. Dak. 525). The electrolytic solution was prepared by adding LiPF6 to a mixed solution of ethylene carbonate (EC) and diethyl carbonate (DEC) in a ratio of 3:7 (wt/wt) so as to become 1 M, to which 10% by mass of fluoroethylene carbonate (FEC) was added.

(2) Relationship Between Crosslinking Amount and Life Characteristics

Figure 4:
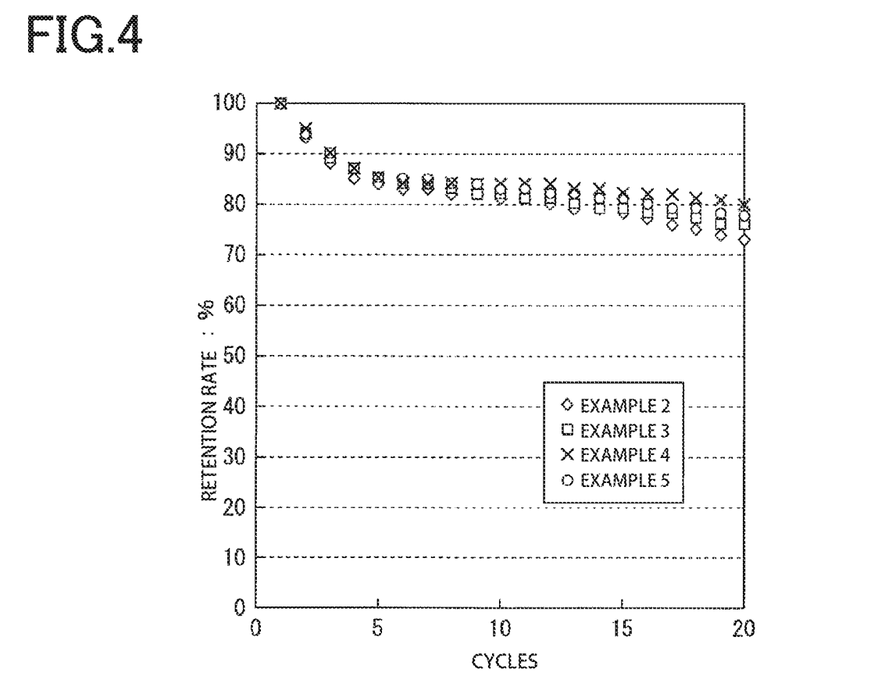
FIG. 4 is a graph illustrating the cycle evaluation results of Examples 2 to 5, and illustrates the relationship between the amount of crosslinking of the binder and the life characteristics.

The inventors of the present invention conducted cycle evaluation using the coin cells obtained in Examples 2 to 5, and examined the relationship between the amount of crosslinking of the binder and the life characteristics. FIG. 4 is a graph illustrating the cycle evaluation results of Examples 2 to 5, and illustrates the relationship between the crosslinking amount of the binder and the life characteristics (illustrates the result of evaluating the relationship between the proportion of the crosslinked reactive groups of the binder and the life the coin cell). Here, the retention rate (%) of the discharge capacity at each cycle was calculated as the life characteristics.

The amount of crosslinking of the binder of Example 2 is an amount corresponding to 0.9 mol % with respect to the total number of reactive groups capable of crosslinking of the binder. The amount of crosslinking of the binder of Example 3 is an amount corresponding to 1.3 mol % with respect to the total number of reactive groups capable of crosslinking of the binder. The amount of crosslinking of the binder of Example 4 is an amount corresponding to 1.6 mol % with respect to the total number of reactive groups capable of crosslinking of the binder. The amount of crosslinking of the binder of Example 5 is an amount corresponding to 1.9 mol % with respect to the total number of reactive groups capable of crosslinking of the binder. All of the Examples 2 to 5 showed good retention rates and showed a retention rate of 70% or more after 20 cycles. Moreover, in the case where the crosslinking amount was less than 0.01 mol %, no crosslinking effect was obtained.

Figure 5:
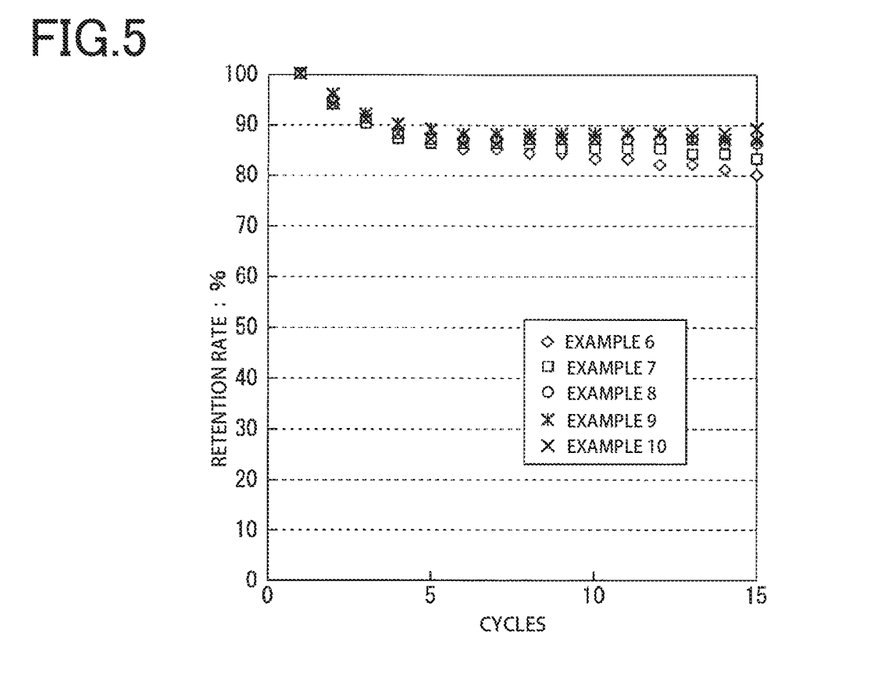
FIG. 5 is a graph illustrating the cycle evaluation results of Examples 6 to 10, and illustrates the relationship between the ratio of a reversible bond/irreversible bond in the binder and the life characteristics.

(3) Relationship Between the Ratio of Reversible Bonding/Irreversible Bonding and Life Characteristics The inventors conducted a cycle evaluation using the coin cells obtained in Examples 6 to 10 and examined the relationship between the ratio of reversible bonding/irreversible bonding in the binder and the life characteristics. FIG. 5 is a graph illustrating the cycle evaluation results of Examples 6 to 10, and illustrates the relationship between the ratio of reversible bonding/irreversible bonding in the binder and the life characteristics. Here as well, the retention rate (%) of the discharge capacity at each cycle was calculated as the life characteristics. In the evaluation using Examples 6 to 10, the crosslinking amount was fixed to 0.9 mol %, and the ratio of crosslinking of reversible bonding to irreversible bonding was examined.

In Example 6, the total number of reactive groups of the main binder and the auxiliary binder consumed by crosslinking by reversible bonding is 0.1 times the number of reactive groups of the main binder consumed by crosslinking by irreversible bonding. In other words, in Example 6, the number of reactive groups of the binder consumed by crosslinking by reversible bonding is 0.1 times the number of reactive groups of the binder consumed by crosslinking by irreversible bonding. In Example 7, the number of reactive groups of the binder consumed by crosslinking by reversible bonding is 0.3 times the number of reactive groups of the binder consumed by crosslinking by irreversible bonding. In Example 8, the number of reactive groups of the binder consumed by crosslinking by reversible bonding is 1 times the number of reactive groups of the binder consumed by crosslinking by irreversible bonding. In Example 9, the number of reactive groups of the binder consumed by crosslinking by reversible bonding is 4 times the number of reactive groups of the binder consumed by crosslinking by irreversible bonding. In Example 10, the number of reactive groups of the binder consumed by crosslinking by reversible bonding is 9 times the number of reactive groups of the binder consumed by crosslinking by irreversible bonding.

In each of the Examples 6 to 10, the retention rate of the discharge capacity showed a retention rate of 80% or more after 15 cycles. It is particularly preferred that the crosslinking amount be at least one times the crosslinking amount in Example 8, Example 9, and Example 10. In other words, it is particularly preferred that the number of reactive groups of the binder consumed by crosslinking by reversible bonding be larger than the number of reactive groups of the binder consumed by crosslinking by irreversible bonding. At this time, the retention rate of the discharge capacity was 85% or more, and it was found that the life characteristics were more improved or even excellent.

(4) Relationship Between the Existence of Nanosilicon and Life

Figure 6:
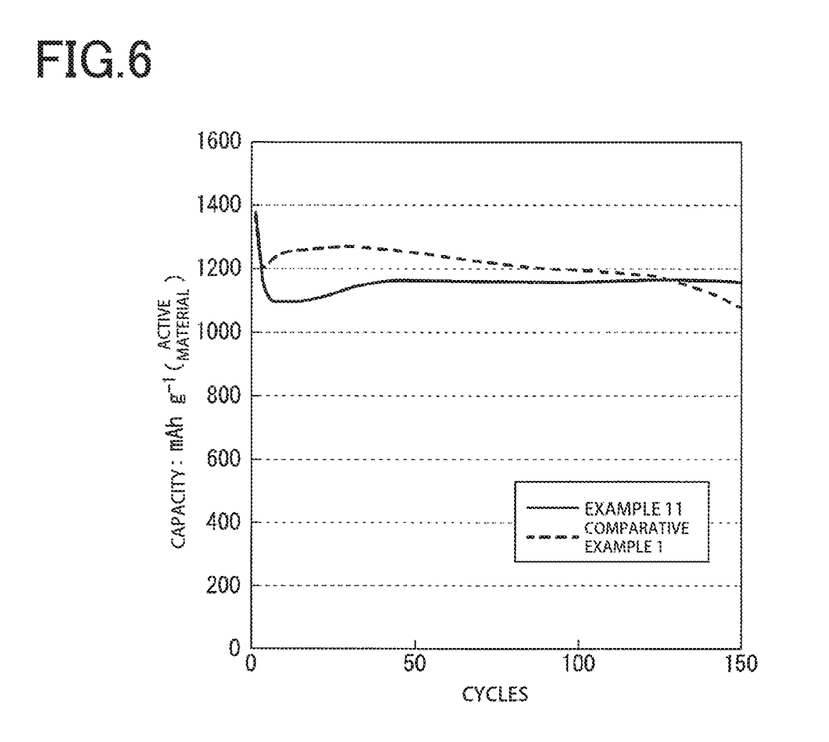
FIG. 6 is a graph illustrating the cycle evaluation results of Example 11 and Comparative Example 1, and illustrates the relationship between the presence/absence of a reversible bond and the capacity in the binder.

The inventors performed a cycle evaluation using the coin cells obtained in Example 11 and Comparative Example 1, and investigated the relationship between the presence or absence of crosslinking by reversible bonding and the life characteristics. FIG. 6 is a graph illustrating the cycle evaluation results of Example 11 and Comparative Example 1, and illustrates the relationship between the presence or absence of reversible bonding and the capacity in the binder. Here, the capacity value (mAhg$^{-1}$) per 1 g of the active material at each cycle was obtained as the life characteristics.

Note that in Example 11, a binder corresponding to Example 2 and Example 9 was used. In addition, in both Example 11 and Comparative Example 1, nanosilicon was used as the negative electrode active material. Using nanosilicon has the effect of suppressing factors due to deterioration of active materials in a life test, and makes it is easy to reflect the effect of the binder. As illustrated in FIG. 6, in the case of crosslinking by reversible bonding and the irreversible bonding in Example 11, a stable capacity can be obtained for 150 cycles. On the other hand, in the case of crosslinking by only irreversible bonding in Comparative Example 1, capacity gradually decreased. This is the difference in the stability of the binder.

(Additional Remarks)

The present invention has been described with reference to the embodiments and the examples, however, the technical scope of the present invention is not limited to the scope described in the above embodiments and examples. Various modifications or improvements may be added to the above-described embodiments, and the above-described embodiments and examples may be arbitrarily combined. Forms to which such changes and the like are added are also included in the technical scope of the present invention.

INDUSTRIAL APPLICABILITY

A negative electrode for a nonaqueous electrolyte secondary battery, a binder for a negative electrode of a nonaqueous electrolyte secondary battery, and a nonaqueous electrolyte secondary battery according to the present invention are used as a power source for various portable electronic devices, a driving storage battery such as for an automobile and the like that require for high-energy density, as an electric storage device of various kinds of energy such as solar energy, wind power generation and the like, as an electricity storage source of domestic electric appliances, and the like.

REFERENCE SIGNS LIST

1 . . . Current collector; 3 . . . Mixture layer; 10 . . . Negative electrode (negative electrode for a nonaqueous electrolyte secondary battery); 20 . . . Nonaqueous electrolyte; 30 . . . Positive electrode; 100 . . . Nonaqueous electrolyte secondary battery

What is claimed is:

1. A negative electrode for a nonaqueous electrolyte secondary battery, comprising:
a current collector; and
a mixture layer formed on the current collector and having an active material and a binder, wherein
the binder comprises an intermolecular chain network in which crosslinking by irreversible bonding and crosslinking by reversible bonding are mixed is formed in the binder;
wherein the binder comprises a main binder and an auxiliary binder, the main binder comprises sodium polyacrylate and the auxiliary binder comprises acrylic acid-maleic acid copolymer, wherein the irreversible bonding given to the main binder is such that an aziridine compound is used as a crosslinking agent and the reversible bonding given to the main binder and the auxiliary binder is a metal ion bond by calcium ions.

2. The negative electrode for a nonaqueous electrolyte secondary battery of claim 1, wherein each of the sodium polyacrylate in the main binder and of the acrylic acid-maleic acid copolymer in the auxiliary binder comprises carboxylic acid groups; and
no less than 0.01 mol % and no greater than 2.0 mol % with respect to a total number of the carboxylic acid groups of the sodium polyacrylate in the main binder and of the acrylic acid-maleic acid copolymer in the auxiliary binder are involved in crosslinking with the crosslinking agent to form the irreversible bonding.

3. The negative electrode for a nonaqueous electrolyte secondary battery of claim 1, wherein
the sodium polyacrylate in the main binder has a molecular weight of no less than 1,000,000 and no greater than 5,000,000; and
the acrylic acid-maleic acid copolymer in the auxiliary binder has a molecular weight of no less than 1,000 and no greater than 10,000.

4. The negative electrode for a nonaqueous electrolyte secondary battery of claim 3, wherein
the auxiliary binder does not include crosslinking by irreversible bonding.

5. The negative electrode for a nonaqueous electrolyte secondary battery of claim 3, wherein the sodium polyacrylate in the main binder comprises carboxylic acid groups; no less than 0.01 mol % and no greater than 3.0 mol % with respect to a number of carboxylic acid groups of the sodium polyacrylate in the main binder are involved in crosslinking with the crosslinking agent to form the irreversible bonding.

6. The negative electrode for a nonaqueous electrolyte secondary battery of claim 3, wherein each of the sodium polyacrylate in the main binder and of the acrylic acid-maleic acid copolymer in the auxiliary binder comprises carboxylic acid groups;
a number of the carboxylic acid groups in the sodium polyacrylate of the main binder and in the acrylic acid-maleic acid copolymer of the auxiliary binder, which groups form the reversible bonding with the metal ion bond, no less than 1 times and no greater than 9 times a number of the carboxylic acid groups in the sodium polyacrylate of the main binder which groups are involved in crosslinking with the crosslinking agent to form the irreversible bonding.

7. The negative electrode for a nonaqueous electrolyte secondary battery of claim 1, wherein the active material is nanosilicon.

8. A nonaqueous electrolyte secondary battery, comprising:
the negative electrode for a nonaqueous electrolyte secondary battery of claim 1;
a positive electrode; and
a nonaqueous electrolyte arranged between the negative electrode and the positive electrode.

* * * * *